United States Patent
Gammel et al.

[11] 3,834,454
[45] Sept. 10, 1974

[54] COOLING ARRANGEMENT FOR THYRISTOR DISCS

[75] Inventors: Gregor Gammel, Dossenheim; Uwe Heidtmann, Nusslock; Elmar Müller, Alzey, all of Germany

[73] Assignee: BBC Aktiengesellschaft Brown, Boneri & Cie, Baden, Switzerland

[22] Filed: Feb. 11, 1972

[21] Appl. No.: 225,522

[30] Foreign Application Priority Data
Feb. 13, 1971  Germany.............................. 2107008
Feb. 13, 1971  Germany.............................. 2107009

[52] U.S. Cl................... 165/80, 165/105, 317/234 A
[51] Int. Cl............................................... F28f 9/00
[58] Field of Search ........... 317/234 A; 165/105, 80

[56] References Cited
UNITED STATES PATENTS
| | | | |
|---|---|---|---|
| 3,390,717 | 7/1968 | Townsend............................. | 165/80 |
| 3,405,299 | 10/1968 | Nall et al. ............................ | 165/105 |
| 3,447,118 | 5/1969 | Ferree................................... | 317/234 A |
| 3,602,429 | 8/1971 | Levedahal et al. .................. | 165/105 |
| 3,653,433 | 4/1972 | Scharli................................. | 165/105 |
| 3,739,234 | 6/1973 | Bylund et al........................ | 165/105 |

*Primary Examiner*—Samuel Scott
*Assistant Examiner*—Allan Russell Burke
*Attorney, Agent, or Firm*—Pierce, Scheffler & Parker

[57] ABSTRACT

A cooling arrangement for dissipating the heat produced by a power thyristor disc includes a pair of metallic press blocks having a good heat conduction characteristic and which have their end faces clamped into pressure contact with opposite faces of the disc. Heat pipes filled with a vaporizable liquid are secured at the sides of the press blocks and these function to effect transfer of the heat from the blocks to the liquid causing it to vaporize and travel longitudinally in the direction away from the blocks. The heat in the vaporized liquid is removed by condensation on the pipe wall and transferred to the surrounding atmosphere by cooling fins located on the outer wall surface of the pipes. The condensate is then returned to the heating zones at the ends of the pipes for recycling by means of a metallic capillary structure lining the inner wall surface of the pipes.

2 Claims, 4 Drawing Figures

COOLING ARRANGEMENT FOR THYRISTOR DISCS

This invention is directed to an improved arrangement for effecting the cooling of a disc type thyristor element wherein the opposite faces of the disc are contacted by press blocks which establish a pressure contact between the adjoining faces of the disc and the blocks, and wherein heat pipes are associated with the press blocks to convey away the heat which is transmitted to the press blocks from the thyristor disc.

The extraordinary high power ratio of thyristor disc elements under contact pressure is made possible by the dissipation of the heat generated internally of the disc through its opposite faces.

In what may be termed the standard cooling system now in use, the press blocks which are clamped into contact with opposite faces of the thyristor disc are solid bodies which are themselves solely relied upon for conveying the heat away from the thyristor disc by conduction through the bodies. These bodies may also be provided with cooling fins to increase the rate of heat dissipation through them. However, since the thermal impedance of the solid bodies is relatively high due to their limited thermal conductance, it is not possible to make use of the full electrical power capacity of the thyristor element.

In the May, 1968 issue of the publication of Scientific America there appears on page 38 a description of a cooling arrangement for thyristor discs wherein a so-called heat pipe closed at both ends is utilized to convey away the heat generated during operation of the thyristor. Each end wall of the pipe which is plane is placed in a heat-transferring contact with one face of a thyristor disc by means of a clamping arrangement so as to transfer heat from the thyristor to the pipe end. The inside wall of the pipe is lined with a capillary structure and the pipe is filled with a working fluid. The end walls of the pipe when heated up by the heat received from the thyristor disc results in evaporation of the working fluid from the adjacent capillary lining structure which then flows in vapor form longitudinally through the pipe and carrying the heat with it in the direction away from the thyristor. The vaporized fluid flowing through the pipe then condenses on the capillary lining provided along the inner wall of the pipe transferring its heat to the pipe wall which then passes by conduction to the outer surface of the pipe where it comes into contact with and is transferred to the surrounding atmosphere. Cooling fins usually extend radially from the pipe so as to increase the radiation surface and thereby increase the rate of heat transfer to the atmosphere. The working fluid condensed in the capillary lining then flows in the longitudinal direction through the lining back to the vicinity of the heating zone at the pipe to complete the flow cycle and from which it is then re-heated to evaporation to initiate a new cycle of heat transfer from the face of the thyristor disc.

The present invention also makes use of a heat pipe arrangement to convey heat away from the face of the thyristor disc but provides a distinctive improvement over what has been previously proposed, as exemplified in the referred-to publication, in that instead of having the end walls of the heat pipe directly contact the face of the thyristor disc, the invention makes use of a pair of press blocks made of a good heat-conductive metallic material which are clamped into pressure contact with opposite faces of the thyristor disc to effect transfer of heat from the thyristor disc to the blocks, and the heat is then transferred from the blocks in a lateral direction, i.e., a direction parallel to the faces of the thyristor disc through a plurality of heat pipes secured in good heat transfer relation to the sides of the press blocks, these pipes being arranged parallel with each other and parallel to the faces of the thyristor disc.

Preferably, each of the press blocks has a T-shaped profile as viewed in a longitudinal section, the lower end of the T terminating in a thrust bearing arrangement which is engaged by a clamping plate, and the upper, enlarged end of the T having a surface area at least equal to that of the end face of the thyristor disc in order to provide for heat transfer from the latter throughout its entire facial area.

According to one embodiment of the invention, each of the heat pipes includes a box-shaped evaporator vessel with a heating zone arranged at the front end, and with condensation tubes inserted into the upper contact area of the evaporator vessel. Moreover, the profile of the evaporator vessel is dimensioned in such manner that the length of the clamping bolts for the clamp halves which respectively apply pressure to the press blocks, is kept to a minimum.

Preferably the lower regions of the evaporator vessels, traversed by the press blocks, possess a small profile, while the upper regions of these vessels, bordering the condensation tubes, are established with elongated flat profiles.

In a further development of the invention, the condensation tubes are provided along their length with laterally extending cooling fins. If the thyristor and its cooling organization are so oriented that the condensation tubes occupy a horizontal, or inclined position, it will be preferable to provide the inner walls of the evaporator vessels as well as the inner walls of the condensation tubes with a capillary structure for conveying condensate back to the evaporation zone. However, if the condensation tubes occupy a vertically upright position as a result of the orientation of the thyristor assembly, it is feasible to provide a capillary structure only on the inner walls of the evaporator vessels, the inner walls of the condensation tubes then remaining as a smooth surface.

Generally speaking, the thermal impedance of the cooling arrangement for thyristor discs provided by the present invention and attained by the novel arrangement of heat pipes is much improved in comparison with conventional cooling systems, at least by a factor of two. As a result of the narrow span of the clamping arrangement, the danger of a fracture in the walls of the heat pipe is completely eliminated. Also, since the pressures are transmitted to the press blocks by means of a self-aligning thrust bearing arrangement, and the press blocks themselves are extraordinarily rigid in a mechanical respect, any buckling of the evaporator vessels, and consequently of the heating zones will be avoided. A further advantage offered by the invention is that the condensation zone, equipped with cooling fins, can be easily adapted to conform with any existing installation requirements. Furthermore, due to the use of a number of parallel arranged condensation tubes, as proposed in accordance with the invention, a higher degree of cooling efficiency will be attained since the flow against the cooling fins eliminates dead air spaces at the back side of the condensation tubes.

The foregoing as well as other objects, features and advantages inherent in the invention will become more apparent from the following detailed description of preferred embodiments and from the accompanying drawings wherein.

Figure 2:
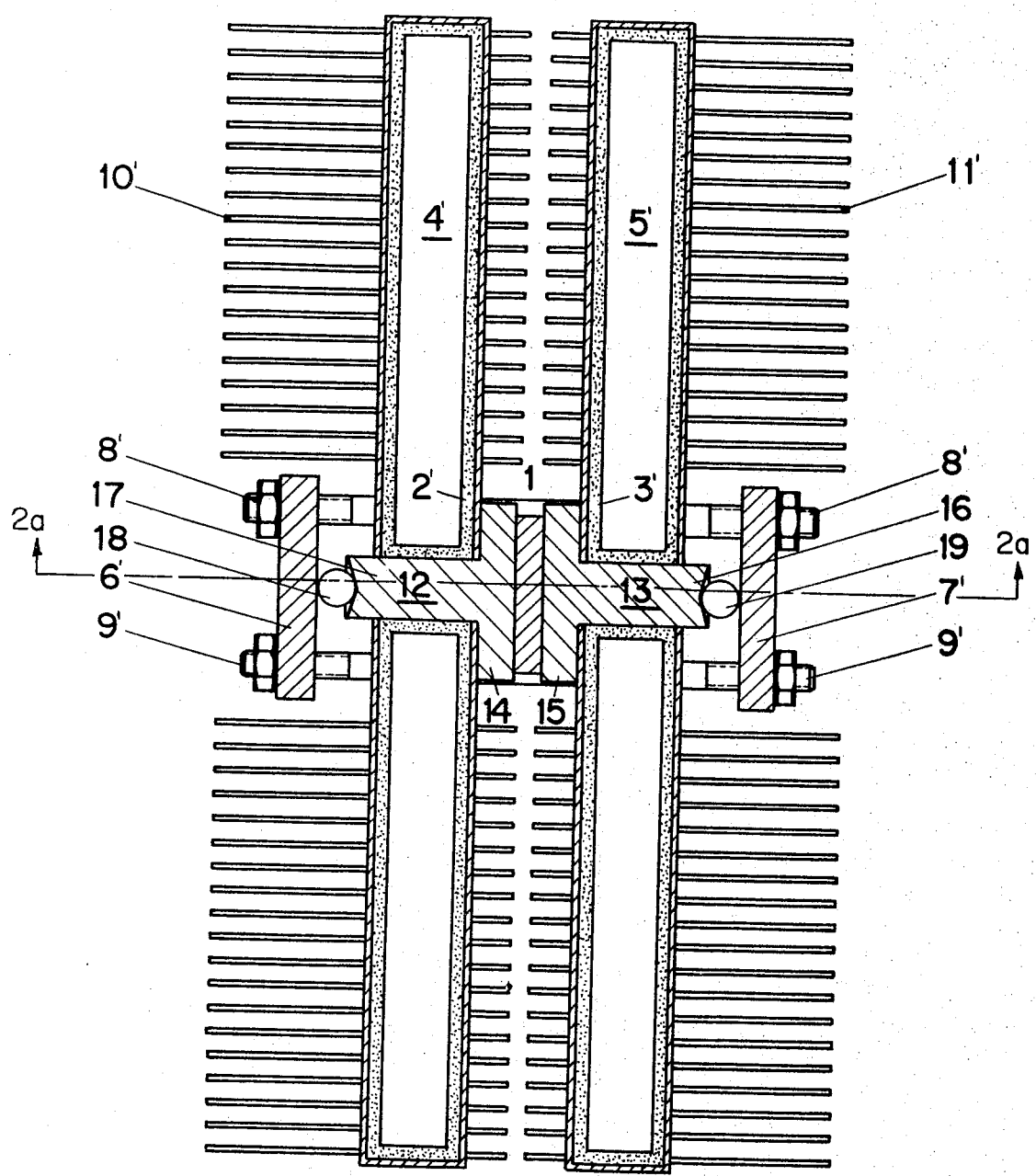
FIG. 2 is a longitudinal sectional view through a cooling system in accordance with the present invention utilizing a parallel arrangement of heat pipes disposed in heat transfer relation with press blocks which in turn are clamped against opposite faces of a thyristor disc and conduct heat from the thyristor disc to the heat pipes.
Figure 3:
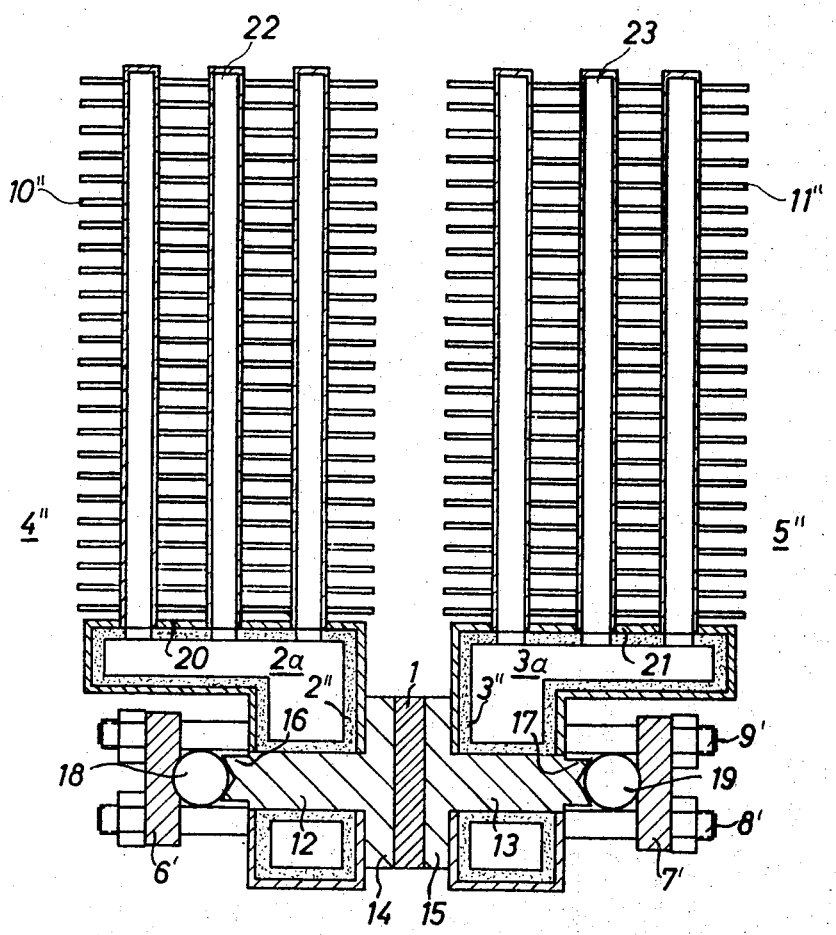

FIG. 3 is a longitudinal section through a modification of the cooling arrangement shown in FIG. 2 and which utilizes a combination of evaporator vessels and condensation tubes connected therewith to dissipate the thyristor heat, the evaporator vessels being constructed as heat pipes in that their inner walls are lined with a capillary structure to return condensate back to the heating zones in the vicinity of the press blocks, and the condensation tubes also being constructed in the same manner if the tubes operate in a horizontal or inclined position, or having smooth inner walls in the case where the tubes operate in a vertical upright position.

Figure 1:
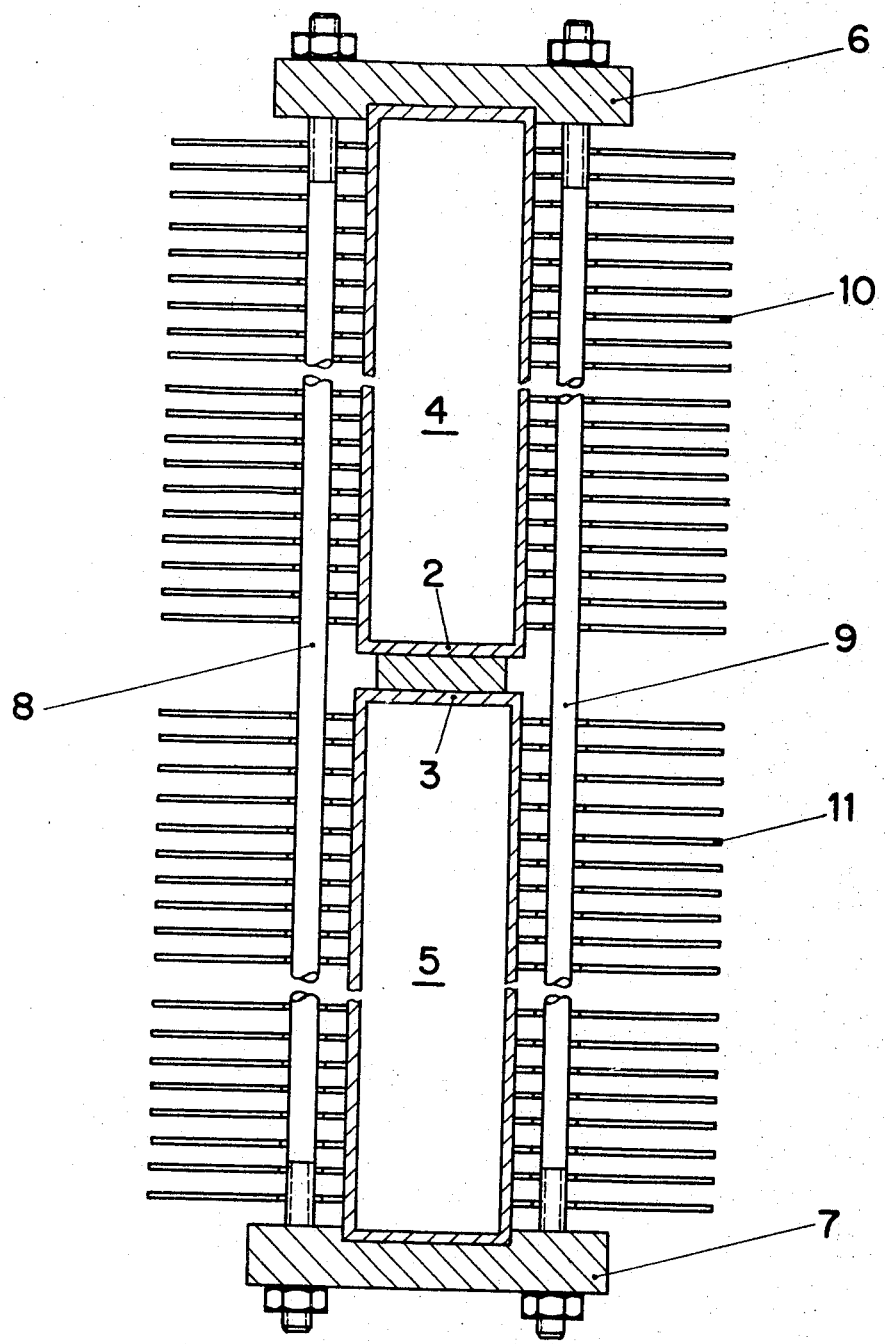
FIG. 1 is a longitudinal sectional view through a cooling system for a thyristor disc which has been adapted from the single-face cooling arrangement disclosed in the heretofore mentioned article in the Scientific America publication to cooling for both faces of the thyristor.

The thyristor cooling system as illustrated in FIG. 1, and adapted from the teaching in the Scientific America article although not known per se, is not claimed, but rather has been included only to facilitate explanation of the technological problems which constitute the basis for the present invention. There it will be seen that opposite faces of the thyristor disc 1 are contacted by the flat end walls 2 and 3 of heat pipes, 4 and 5.

The inner wall surfaces of the two heat pipes 4 and 5 are lined with a metallic capillary structure and the pipes are filled with a working fluid. Any fluid which possesses, within a temperature range of from 20°C to 100°C, a sufficient vapor pressure, i.e., at least 100 torr, can be used as the working fluid. A preferred fluid is pure water. The heat dissipated by the thyristor disc 1, will be transferred to the heating zones within the adjacent ends of the heat pipes 4, 5 causing the working fluid in such ends to heat up and evaporate. The hot vaporized fluid flows longitudinally through the heat pipes and is caused to cool and condense on the inner walls of the heat pipes. When condensing, the working fluid transfers the dissipated heat, absorbed by it during the evaporation process, to the radially extending cooling fins 10, 11 provided respectively along the outer surfaces of the heat pipes 4, 5.

In order to provide for heat transfer from the opposite faces of the thyristor disc to the end walls of the heat pipes, the latter are placed under axial pressure against the thyristor disc 2 by a clamping arrangement which includes clamping plates 6 and 7 that are interconnected by tie bolts 8 and 9. The necessary pressure is established by tightening these bolts. However since the clamping pressure must be high, up to 70 kp/cm², there is considerable danger of producing a wall fracture in the substantially elongated heat pipe structure. Moreover, the heated end walls 2, 3 of these pipes may also buckle under the pressures imposed especially in the situation where surface irregularities in the surfaces in contact with each other result in an uneven distribution of the pressure over these surfaces, thus impairing greatly the transfer of heat between the thyristor disc 1 and the heated end walls 2, 3. Furthermore because of technological reasons, there is a limit to the extent to which the two heat pipes may be lengthened thus leading to installation problems.

The thyristor disc-heat pipe organization in accordance with the present invention does not suffer from any of these disadvantages and two embodiments, illustrated respectively in FIGS. 2 and 3 will now be described. For the sake of clarity, similar reference numerals are used for similar components of the cooling systems shown in FIGS. 1, 2a, 2 and 3.

Figure 2A:
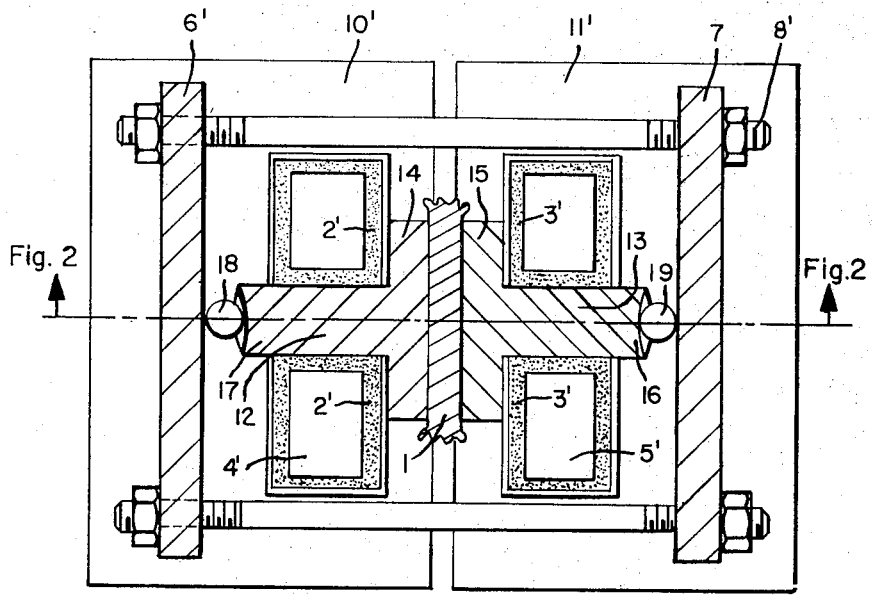
FIG. 2a is a transverse section taken on line 2a—2a of FIG. 2.

With reference now to FIGS. 2 and 2a it will be at once observed that a principal distinction between it and FIG. 1 is that the heat pipes are not placed in direct pressure contact with the faces of the thyristor disc. Rather, the heat transfer path from the thyristor disc to the heating zones of the heat pipes is an indirect one, and the heat pipes receive heat by conduction through metallic press blocks 12, 13 having a good heat transfer coefficient, these blocks having a T-shape when viewed in section, as in FIG. 2.

The enlarged head portions 14, 15 of the press blocks have an end facial area at least equal to that of the opposite faces of the thyristor disc 1 so as to provide a good heat flow path from the thyristor over the entire areas of the faces and may, if desired, be provided with cylindrical recesses identical in diameter to that of the thyristor disc 1 so as to provide a good seat alignment for the press blocks. The opposite ends 16, 17 of the press blocks are provided with conical recesses which receive self-aligning thrust bearing members 18, 19 in the form of balls. Clamping plates 6', 7' engage the thrust balls 18, 19 and threaded tie bolts 8' and 9', which pass through the clamping plates, when drawn up by the nuts, serve to applying a clamping pressure to the assembly which is transferred through the press blocks 12, 13 to the opposite faces of the thyristor disc 1.

Heat pipes 4' and 5' which have a rectangular configuration are located respectively in good heat transfer relation with the stem portions of the T-shaped press blocks 12 and 13 which pass transversely through the middle of the pipes. A portion of the wall of each pipe is also seen to be seated against the underside of the head portion of each press block, thereby to provide additional contact surface therebetween for transfer of heat from the press block to the interior of the pipes.

The heat pipes have a parallel relationship and establish heat transfer zones 2', 3' from the press blocks 12, 13 to the associated portions of the heat pipes. The inner walls of the heat pipes are lined with a metallic capillary structure in which the vaporized liquid is condensed, and sets of radially extending fins 10', 11' mounted at the exterior walls of the heat pipes function to dissipate heat to the surrounding atmosphere. These cooling fins can be attached either individually to the walls or constructed as a unitary package which can then be attached to the pipes.

It will be further observed from FIG. 2 that the thyristor disc 1 is located at the center, so to speak, of the assembly of press blocks, clamping members and heat pipe ends which makes it feasible to enclose these components within a dustproof housing for industrial applications where the thyristor operates in a dust-laden atmosphere, all without interferring with the function of the finned heat pipes which are of course left uncovered and exposed to the atmosphere.

The operating mode of the embodiment illustrated in FIG. 2 is somewhat similar to that which has already been described in connection with the arrangement disclosed in FIG. 1. Heat dissipated by the thyristor disc 1 and transferred through its opposite faces to the press blocks 12, 13 moves by conduction to the heating zones 2', 3' which then causes the liquid fluid at these portions of the heat pipes 4', 5' to be heated up and vaporized. The vaporized fluid carrying the heat moves longitudinally through the heat pipes and condenses along and becomes completely absorbed in the capillary lining to thus transfer heat through the pipe walls to the cooling fins, and then returns in condensed form through the capillary lining to the zones 2', 3' for recycling.

The embodiment illustrated in FIG. 3 is similar in many respects to that which is illustrated in FIG. 2. The arrangement of the thyristor disc 1, press blocks 12, 13, clamping plates 6', 7', thrust bearings 16–18 and 17–19, and tie bolts 8' and 9' is identical. However, the arrangement and configuration of the heat pipes 4'' and 5'' is somewhat different. In FIG. 3, it will be seen that two L-shaped box-like evaporator vessels 2a, 3a with flat walls are provided, one part of the vessel 2a being provided with a bore having a profile matching that of the stem portion of press block 12 which passes through that bore and establishes a good heat transfer path from the flat stem portion of the block as well as the flat underface of the enlarged heat portion 14 to the structurally related wall portion of the evaporator vessel 2a. The second evaporator vessel 3a is structurally associated with the other press block 13 in the identical manner. Both evaporator vessels have an inner capillary lining.

Connected to the other part of the flat-sided evaporator vessel 2a are a number of condensation tubes 22 provided with cooling fins 10'', the tubes 22 being located in parallel spaced relation and extending normal to the vessel wall. The outer ends of the condensation tubes 22 are closed but the inner ends are aligned with openings through the vessel wall 20 so as to provide for passage of the vaporized fluid.

In an identical manner, a number of parallel condensation tubes 23 provided with cooling fins 11'' are mounted on the other part of evaporator vessel 3a, being connected at the wall part 21.

If desired, the cooling fins 10'', 11'' may each be constructed in pre-packaged form which are then pierced by the condensation tubes which then support the fin packages.

Preferably the profile of the box-like L-shaped evaporator vessels 2a, 3a is designed in such manner that the distance between the two clamping halves 6', 7' is kept to a minimum which has the advantage that the buckling stress imposed upon the press blocks 12, 13 is likewise kept to a minimum. This is accomplished by the profile illustrated in FIG. 3 in that the portions of the vessels 2a, 3a traversed by the stems of press blocks 12, 13 respectively, have a narrow profile while the profile of the other portions of the vessels 2a, 3a associated with the condensation tubes 22, 23 respectively is elongated and relatively flat. The elongation permits use of a maximum number of condensation tubes thereby to obtain a more uniform distribution of the heat among the cooling fins 10'', 11''.

The operating mode of the embodiment according to FIG. 3 is generally the same as in the FIG. 2 embodiment. The heat given off from thyristor disc 1 to press blocks 12, 13 is transferred to the heating zones 2, 3 of the evaporator vessels 2a, 3a which heats up and evaporates the working fluid. The heated vapor passes along the inside of these vessels and passes into the condensation tubes 22, 23 where it condenses on the inner walls. On the assumption that the embodiment illustrated in FIG. 3 operates in a vertical upright position, the working fluid when condensed on the inner wall surfaces of the condensation tubes 22, 23 will return by gravitational force into the evaporator vessels 2a, 3a from whence it is returned through the capillary lining structure of the latter to the heating zones 2'', 3'' for recycling. However, should the thyristor assembly operate in such an attitude that the condensation tubes lie horizontal or inclined, these tubes will also be lined with a metallic capillary structure which will then serve to completely absorb the condensate as it forms along the tubes and return it to the capillary lining structure of the evaporator vessels.

In the embodiment illustrated in FIG. 3 those portions of the capillary liner structures of the two evaporator vessels 2a, 3a adjacent the stem portion of the press blocks 12, 13 lie in direct contact therewith at the pass-through openings provided in the vessels. However, these pass-through openings may be completly walled-in provided that the walls lie in very close contact with the stem portions of the press blocks so as to eliminate the possibility of setting up any resistance to transfer of heat from the press blocks to the evaporator vessels.

We claim:

1. A cooled power thyristor assembly comprising a thyristor disc, a pair of metallic press blocks having a good heat conduction characteristic and which include enlarged heads the outer end faces of which have an area at least equal to that of said thyristor disc, clamping means common to said press blocks and which serve to clamp said outer end faces of said block heads into pressure contact with the opposite faces of said thyristor disc, and a heat pipe extending laterally from the side of each of said press blocks in a direction parallel with the faces of said thyristor disc, each said heat pipe having a transversely extending bore through which the corresponding press block extends in heat transfer relation therewith, each said heat pipe including a heating zone therein for vaporizing a liquid filling, each said heating zone being constituted by one portion of said heat pipe in heat transfer relation at the side of the press block and another portion in heat transfer relation with the opposite end face of the block head for removing heat therefrom, said vapor traveling through the pipe in a direction away from said press block and being returned in the form of condensate to said heating zone through a capillary structure lining the pipe for re-circulation.

2. A cooled power thyristor assembly as defined in claim 1 wherein the transverse bore through each said heat pipe is located centrally between the ends thereof.

* * * * *